(12) United States Patent
Endo

(10) Patent No.: US 9,369,637 B2
(45) Date of Patent: Jun. 14, 2016

(54) WIRELESS TERMINALS AND WIRELESS SYSTEM USING THREE DIFFERENT ATTRIBUTES

(71) Applicant: OLYMPUS CORPORATION, Tokyo (JP)

(72) Inventor: Takahisa Endo, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/068,216

(22) Filed: Oct. 31, 2013

(65) Prior Publication Data

US 2014/0055678 A1 Feb. 27, 2014

Related U.S. Application Data

(63) Continuation of application No. PCT/JP2012/055964, filed on Mar. 8, 2012.

(30) Foreign Application Priority Data

May 11, 2011 (JP) ................. 2011-106113

(51) Int. Cl.
*H04N 5/268* (2006.01)
*H04N 21/414* (2011.01)
(Continued)

(52) U.S. Cl.
CPC .......... *H04N 5/268* (2013.01); *H04N 21/41407* (2013.01); *H04N 21/43637* (2013.01); *H04W 4/00* (2013.01); *H04N 7/147* (2013.01)

(58) Field of Classification Search
CPC .. H04N 21/43615; H04N 7/106; H04N 5/268
USPC ..................................... 725/81; 709/231, 219
See application file for complete search history.

(56) References Cited

U.S. PATENT DOCUMENTS 7,583,954 B2 * 9/2009 Inagaki .................. 455/411
8,032,077 B2 * 10/2011 Yuasa .................... 455/3.06
(Continued)

FOREIGN PATENT DOCUMENTS

JP     2001197150 A * 7/2001
JP     2001345817 A * 12/2001
(Continued)

OTHER PUBLICATIONS

International Search Report dated Apr. 24, 2012, issued in corresponding application No. PCT/JP2012/055964.
(Continued)

*Primary Examiner* — Jefferey Harold
*Assistant Examiner* — Humam Satti
(74) *Attorney, Agent, or Firm* — Westerman, Hattori, Daniels & Adrian, LLP

(57) ABSTRACT

A wireless terminal may include: a communication unit that transmits/receives information; a recognition unit that recognizes whether a wireless terminal having transmitted the information is an opposite attribute wireless terminal based on the information received in the communication unit, when a wireless terminal having an attribute opposite to an attribute of its own terminal between the video transmission attribute and the video reception attribute is defined as the opposite attribute wireless terminal and a wireless terminal having the instruction attribute is defined as an instruction attribute wireless terminal; and a communication control unit that controls the communication unit to transmit information on a wireless terminal recognized as the opposite attribute wireless terminal to the instruction attribute wireless terminal when the recognition unit recognizes that the wireless terminal having transmitted the information is the opposite attribute wireless terminal.

6 Claims, 14 Drawing Sheets

(51) Int. Cl.
*H04W 4/00* (2009.01)
*H04N 21/4363* (2011.01)
*H04N 7/14* (2006.01)

(56) References Cited

U.S. PATENT DOCUMENTS

| | | | |
|---|---|---|---|
| 8,811,275 B2 * | 8/2014 | Kim | 370/328 |
| 2001/0049268 A1 * | 12/2001 | Kobayashi | 455/88 |
| 2003/0162531 A1 * | 8/2003 | Yahiro | 455/414 |
| 2005/0130626 A1 | 6/2005 | Inagaki | |
| 2006/0209745 A1 * | 9/2006 | MacMullan et al. | 370/328 |
| 2008/0129879 A1 | 6/2008 | Shao et al. | |
| 2008/0141329 A1 * | 6/2008 | Igoe | 725/141 |
| 2009/0060456 A1 * | 3/2009 | Kim | 386/96 |
| 2009/0125964 A1 * | 5/2009 | Freundlich et al. | 725/118 |
| 2009/0285138 A1 * | 11/2009 | Thomas et al. | 370/310 |
| 2009/0322948 A1 * | 12/2009 | Funabiki et al. | 348/571 |
| 2009/0327467 A1 * | 12/2009 | Cho et al. | 709/223 |
| 2010/0050214 A1 * | 2/2010 | Funabiki et al. | 725/81 |
| 2010/0083035 A1 * | 4/2010 | Kim et al. | 714/4 |
| 2010/0164693 A1 * | 7/2010 | Zhang et al. | 340/10.31 |
| 2010/0272054 A1 * | 10/2010 | Tatsuta et al. | 370/329 |
| 2011/0128442 A1 * | 6/2011 | Blanchard et al. | 348/468 |
| 2011/0161660 A1 * | 6/2011 | Zhang et al. | 713/156 |
| 2011/0271308 A1 * | 11/2011 | Igoe | 725/81 |
| 2011/0305203 A1 * | 12/2011 | Matsushita et al. | 370/328 |
| 2012/0008052 A1 * | 1/2012 | Funabiki et al. | 348/723 |
| 2012/0011535 A1 * | 1/2012 | Eguchi et al. | 725/25 |
| 2012/0047538 A1 * | 2/2012 | Murase et al. | 725/81 |
| 2012/0051340 A1 * | 3/2012 | Patil et al. | 370/338 |
| 2013/0304860 A1 * | 11/2013 | Yang et al. | 709/217 |

FOREIGN PATENT DOCUMENTS

| | | |
|---|---|---|
| JP | 3441422 B2 | 9/2003 |
| JP | 2005-285091 A | 10/2005 |
| JP | 2009-44877 A | 2/2009 |
| JP | 2010-114798 A | 5/2010 |
| JP | 2010-272975 A | 12/2010 |

OTHER PUBLICATIONS

Extended European Search Report dated Oct. 1, 2014, issued in European Application No. 12782851.5.(7 pages).

* cited by examiner

FIG. 6

| MAC ADDRESS | TERMINAL NAME | ATTRIBUTE | STATE |
|---|---|---|---|
| MAC_01R | VIDEO RECEIVING TERMINAL 1 | Sink | NON-CONNECTED |
| MAC_02R | VIDEO RECEIVING TERMINAL 2 | Sink | NON-CONNECTED |
|  |  |  |  |
|  |  |  |  |
|  |  |  |  |

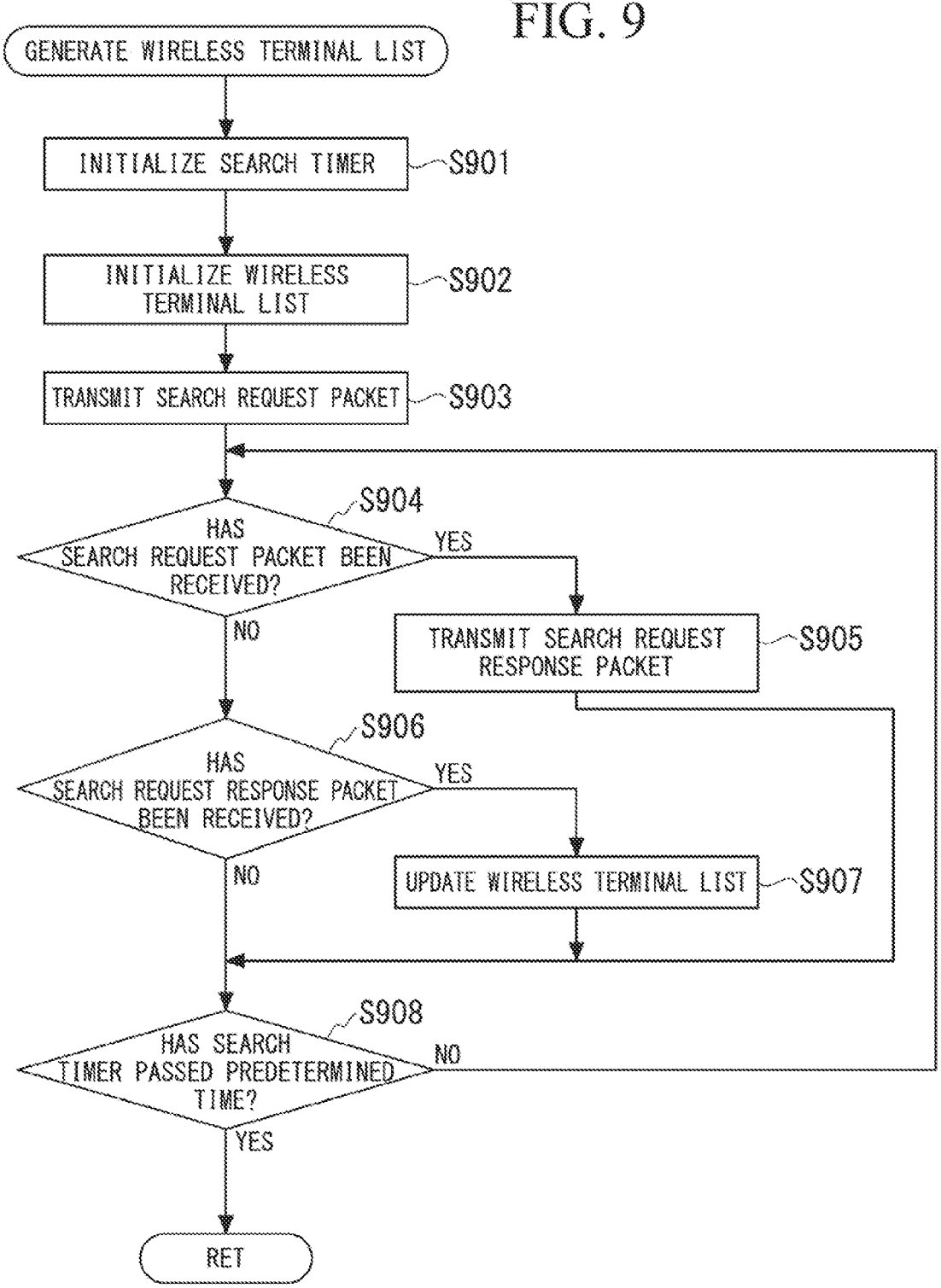

FIG. 11A

| MAC ADDRESS | TERMINAL NAME | ATTRIBUTE | STATE |
|---|---|---|---|
| MAC_01R | VIDEO RECEIVING TERMINAL 1 | Sink | NON-CONNECTED |
| MAC_02R | VIDEO RECEIVING TERMINAL 2 | Sink | NON-CONNECTED |
| MAC_01T | VIDEO TRANSMITTING TERMINAL 1 | Source | NON-CONNECTED |
| MAC_02T | VIDEO TRANSMITTING TERMINAL 2 | Source | NON-CONNECTED |
|  |  |  |  |

FIG. 11B

| MAC ADDRESS | TERMINAL NAME | ATTRIBUTE | STATE |
|---|---|---|---|
| MAC_01R | VIDEO RECEIVING TERMINAL 1 | Sink | CONNECTED |
| MAC_02R | VIDEO RECEIVING TERMINAL 2 | Sink | CONNECTED |
| MAC_01T | VIDEO TRANSMITTING TERMINAL 1 | Source | NON-CONNECTED |
| MAC_02T | VIDEO TRANSMITTING TERMINAL 2 | Source | CONNECTED |
|  |  |  |  |

WIRELESS TERMINALS AND WIRELESS SYSTEM USING THREE DIFFERENT ATTRIBUTES

CROSS REFERENCE TO RELATED APPLICATIONS

This application is a continuation application based on a PCT Patent Application No. PCT/JP2012/055964, filed Mar. 8, 2012, whose priority is claimed on Japanese Patent Application No. 2011-106113, filed May 11, 2011, the entire content of which are hereby incorporated by reference.

BACKGROUND OF THE INVENTION

1. Field of the Invention

The present invention relates to a wireless terminal and a wireless system that wirelessly transmit or receive a video.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

Conventionally, according to a method in which a video receiving terminal selects a video from a plurality of video transmitting terminals and displays a selected video, a video signal switching apparatus (a switcher) is arranged between the video receiving terminal and the transmitting terminals, each terminal is connected to the video signal switching apparatus using cables, and video selection is performed by controlling the video signal switching apparatus. When the number of video receiving terminals and video transmitting terminals to be used is increased, there is a problem that wiring by cables and the configuration of the video signal switching apparatus are complicated and it is not possible to quickly cope with a change in the layout of the video receiving terminals and the video transmitting terminals.

In recent years, with the improvement of wireless transmission technology, since it is possible to wirelessly transmit a high vision video from a video transmitting terminal to a video receiving terminal, a method in which a video to be displayed on the video receiving terminal is selected by switching a wireless connection between the video receiving terminal and the video transmitting terminal has been considered.

As a method for setting a combination of connections among a plurality of wireless terminals, Japanese Patent (Granted) Publication No. 3441422 discloses a wireless system including the plurality of wireless terminals that exchange data, and a wireless control terminal that instructs the combination of the connections. The present wireless system includes means that discovers wireless terminals within a range reachable by radio from the wireless control terminal, and a user interface for selecting wireless terminals to be connected from the discovered wireless terminals, and a method in which a connection instruction is transmitted to each of the selected wireless terminals through the user interface so that a wireless connection from a plurality of wireless terminals to an arbitrary wireless terminal is established has been disclosed.

FIG. 13 and FIG. 14 illustrate a connection switching operation of a wireless terminal. In FIG. 13, video transmission is performed between a video transmitting terminal 10a and a video receiving terminal 20a and between a video transmitting terminal 10b and a video receiving terminal 20b.

At this time, when a connection switching instruction is wirelessly transmitted from a control terminal 30 to the video transmitting terminals and the video receiving terminals, it is possible to switch a wireless connection such that video transmission is performed between the video transmitting terminal 10a and the video receiving terminal 20b and between a video transmitting terminal 10c and the video receiving terminal 20a, as illustrated in FIG. 14.

However, in the wireless system, as illustrated in FIG. 15, there are cases in which the control terminal is unable to discover a video transmitting terminal and a video receiving terminal within a connectable range according to an arrangement position of a video transmitting terminal/a video receiving terminal and the control terminal and a wireless environment. In detail, since a video receiving terminal 20a can be connected to a video transmitting terminal 10a, a video transmitting terminal 10b, and a video transmitting terminal 10c, but a control terminal 30 is not able to discover the video transmitting terminal 10c, there are situations in which the control terminal 30 is not able to instruct a wireless connection between the video receiving terminal 20a and the video transmitting terminal 10c.

SUMMARY

The present invention provides a wireless terminal and a wireless system by which it is possible to establish a wireless connection among wireless terminals connectable to one another.

According to a first aspect of the present invention, a wireless terminal may include only a video transmission attribute or only a video reception attribute when an attribute for wirelessly transmitting a video is defined as the video transmission attribute, an attribute for wirelessly receiving and displaying a video is defined as the video reception attribute, and an attribute for instructing transmission of a video to a plurality of wireless terminals having only the video transmission attribute and a plurality of wireless terminals having only the video reception attribute is defined as an instruction attribute. The wireless terminal may include: a communication unit which transmits/receives information; a recognition unit which recognizes whether a wireless terminal having transmitted the information is an opposite attribute wireless terminal based on the information received in the communication unit, when a wireless terminal having an attribute opposite to an attribute of its own terminal between the video transmission attribute and the video reception attribute is defined as the opposite attribute wireless terminal and a wireless terminal having the instruction attribute is defined as an instruction attribute wireless terminal; and a communication control unit which controls the communication unit to transmit information on a wireless terminal recognized as the opposite attribute wireless terminal to the instruction attribute wireless terminal when the recognition unit recognizes that the wireless terminal having transmitted the information is the opposite attribute wireless terminal, controls the communication unit not to transmit information on a wireless terminal recognized not to be the opposite attribute wireless terminal to the instruction attribute wireless terminal when the recognition unit recognizes that the wireless terminal having transmitted the information is not the opposite attribute wireless terminal, and controls the communication unit to perform a process of establishing a wireless connection with the opposite attribute wireless terminal designated by received information when the communication unit receives, from the instruction attribute wireless terminal, the information for instructing video transmission and designating the opposite attribute wireless terminal that is a video transmission destination.

According to a second aspect of the present invention, in the wireless terminal according to the first aspect, in a state in which communication with the opposite attribute wireless terminal has been established, the communication control unit may further control the communication unit to transmit information on the wireless terminal recognized as the opposite attribute wireless terminal to the instruction attribute wireless terminal.

According to a third aspect of the present invention, a wireless system may include a plurality of wireless terminals having only a video transmission attribute and a plurality of wireless terminals having only a video reception attribute when an attribute for wirelessly transmitting a video is defined as the video transmission attribute, an attribute for wirelessly receiving and displaying a video is defined as the video reception attribute, and an attribute for instructing transmission of a video to the plurality of wireless terminals having only the video transmission attribute and the plurality of wireless terminals having only the video reception attribute is defined as an instruction attribute. A wireless terminal having only the video transmission attribute or only the video reception attribute may include: a first communication unit which transmits/receives information; a recognition unit which recognizes whether a wireless terminal having transmitted the information is an opposite attribute wireless terminal based on the information received in the first communication unit, when a wireless terminal having an attribute opposite to an attribute of its own terminal between the video transmission attribute and the video reception attribute is defined as the opposite attribute wireless terminal and a wireless terminal having the instruction attribute is defined as an instruction attribute wireless terminal; and a first communication control unit which controls the first communication unit to transmit information on a wireless terminal recognized as the opposite attribute wireless terminal to the instruction attribute wireless terminal when the recognition unit recognizes that the wireless terminal having transmitted the information is the opposite attribute wireless terminal, controls the communication unit not to transmit information on a wireless terminal recognized not to be the opposite attribute wireless terminal to the instruction attribute wireless terminal when the recognition unit recognizes that the wireless terminal having transmitted the information is not the opposite attribute wireless terminal, and controls the first communication unit to perform a process of establishing a wireless connection with the opposite attribute wireless terminal designated by information when the first communication unit receives, from the instruction attribute wireless terminal, the information for instructing video transmission and designating the opposite attribute wireless terminal that is a video transmission destination.

According to a fourth aspect of the present invention, in the wireless system according to the third aspect, the wireless system may further include the instruction attribute wireless terminal. The instruction attribute wireless terminal may include: a second communication unit which transmits/receives information; and a second communication control unit which selects a first wireless terminal having only the video transmission attribute and a second wireless terminal having only the video reception attribute from wireless terminals indicated by the information on the wireless terminal recognized as the opposite attribute wireless terminal received by the second communication unit, and controls the second communication unit to transmit information, which instructs video transmission and designates one of the first wireless terminal and the second wireless terminal as the opposite attribute wireless terminal that is a video transmission destination, to a remaining one of the first wireless terminal and the second wireless terminal.

According to a fifth aspect of the present invention, a wireless communication method, by using a wireless terminal that includes only a video transmission attribute or only a video reception attribute when an attribute for wirelessly transmitting a video is defined as the video transmission attribute, an attribute for wirelessly receiving and displaying a video is defined as the video reception attribute, and an attribute for instructing transmission of a video to a plurality of wireless terminals having only the video transmission attribute and a plurality of wireless terminals having only the video reception attribute is defined as an instruction attribute, may include: transmitting/receiving information by a communication unit; recognizing, by a recognition unit, whether a wireless terminal having transmitted the information is an opposite attribute wireless terminal based on the information received by the communication unit, when a wireless terminal having an attribute opposite to an attribute of its own terminal between the video transmission attribute and the video reception attribute is defined as the opposite attribute wireless terminal and a wireless terminal having the instruction attribute is defined as an instruction attribute wireless terminal; controlling the communication unit to transmit information on a wireless terminal recognized as the opposite attribute wireless terminal to the instruction attribute wireless terminal when the recognition unit recognizes that the wireless terminal having transmitted the information is the opposite attribute wireless terminal; controlling the communication unit not to transmit information on a wireless terminal recognized not to be the opposite attribute wireless terminal to the instruction attribute wireless terminal when the recognition unit recognizes that the wireless terminal having transmitted the information is not the opposite attribute wireless terminal; and controlling the communication unit to perform a process of establishing a wireless connection with the opposite attribute wireless terminal designated by received information when the communication unit receives, from the instruction attribute wireless terminal, the information for instructing video transmission and designating the opposite attribute wireless terminal that is a video transmission destination.

According to a sixth aspect of the present invention, a computer readable device may record programmed instructions for a wireless terminal, which includes only a video transmission attribute or only a video reception attribute when an attribute for wirelessly transmitting a video is defined as the video transmission attribute, an attribute for wirelessly receiving and displaying a video is defined as the video reception attribute, and an attribute for instructing transmission of a video to a plurality of wireless terminals having only the video transmission attribute and a plurality of wireless terminals having only the video reception attribute is defined as an instruction attribute. The instructions, when executed by a computer, may cause the computer to perform: transmitting/receiving information by a communication unit; recognizing, by a recognition unit, whether a wireless terminal having transmitted the information is an opposite attribute wireless terminal based on the information received by the communication unit, when a wireless terminal having an attribute opposite to an attribute of its own terminal between the video transmission attribute and the video reception attribute is defined as the opposite attribute wireless terminal and a wireless terminal having the instruction attribute is defined as an instruction attribute wireless terminal; controlling the communication unit to transmit information on a wireless terminal recognized as the opposite attribute wireless terminal to the instruction attribute wireless terminal when the recognition unit recognizes that the wireless terminal having transmitted the information is the opposite attribute wireless terminal; controlling the communication unit not to transmit information on a wireless terminal recognized not to be the opposite attribute wireless terminal to the instruction attribute wireless terminal when the recognition unit recognizes that the wireless terminal having transmitted the information is not the opposite attribute wireless terminal; and controlling the communication unit to perform a process of establishing a wireless connection with the opposite attribute wireless terminal designated by received information when the communication unit receives, from the instruction attribute wireless terminal, the information for instructing video transmission and designating the opposite attribute wireless terminal that is a video transmission destination.

BRIEF DESCRIPTION OF THE DRAWINGS

FIG. 6 is a reference diagram illustrating a connection destination list in accordance with the first preferred embodiment of the present invention.

FIG. 9 is a flowchart illustrating an operation procedure of a control terminal in accordance with the first preferred embodiment of the present invention.

FIG. 11A is a reference diagram illustrating a wireless terminal list in accordance with the first preferred embodiment of the present invention.

FIG. 11B is a reference diagram illustrating a wireless terminal list in accordance with the first preferred embodiment of the present invention

DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

Figure 1:
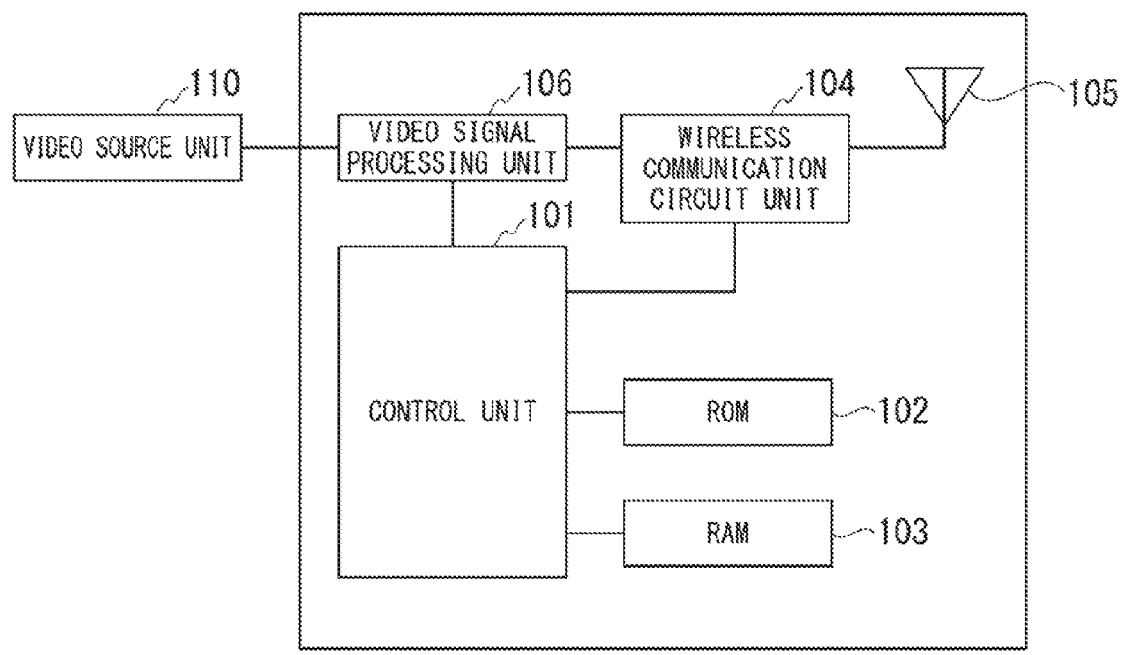
FIG. 1 is a block diagram illustrating the constitution of a video transmitting terminal in accordance with a first preferred embodiment of the present invention.

Hereinafter, a first preferred embodiment of the present invention is described with reference to the accompanying drawings. FIG. 1 illustrates the electrical constitution of a video transmitting terminal 100 having a video transmitting function among wireless terminals in accordance with the first preferred embodiment of the present invention. The video transmitting terminal 100 includes a control unit 101 (a recognition unit, a communication control unit), a ROM 102, a RAM 103, a wireless communication circuit unit 104 (a communication unit), an antenna 105, a video signal processing unit 106, and a video source unit 110, which are connected to one another as illustrated in FIG. 1. The elements other than the video source unit 110 are arranged in the same housing.

The control unit 101 operates according to a program stored in the ROM 102, and controls an operation sequence of the video transmitting terminal 100. The ROM 102 is a non-volatile memory such as a Flash ROM, and stores various types of setting information including program data for controlling the video transmitting terminal 100 and a communication setting parameter.

The RAM 103 is used as a work area that is used for an operation and the like of the control unit 101, and an area for temporarily storing various types of settings and the like. The wireless communication circuit unit 104 includes a high frequency circuit section necessary for wireless communication, an encoding/decoding circuit section, a buffer memory and the like, and is connected to the antenna 105. In the first preferred embodiment, as a wireless communication scheme, a predetermined wireless scheme such as IEEE 802.11 is used. The video signal processing unit 106 performs a compression process on video data supplied from the video source unit 110 using a predetermined scheme, and then supplies the compressed video data to the wireless communication circuit unit 104.

The video source unit 110 is a device that supplies video data of a video camera, a DVD player and the like, and is connected to the video signal processing unit 106 through a video interface such as HDMI, DVI, or SDI. In FIG. 1, the video source unit 110 is arranged in a housing different from the housing in which the control unit 101 and the like are arranged, and is connected to the video signal processing unit 106. However, the video source unit 110 may be arranged in the housing in which the control unit 101 and the like are arranged, and may be connected to the video signal processing unit 106.

Figure 2:
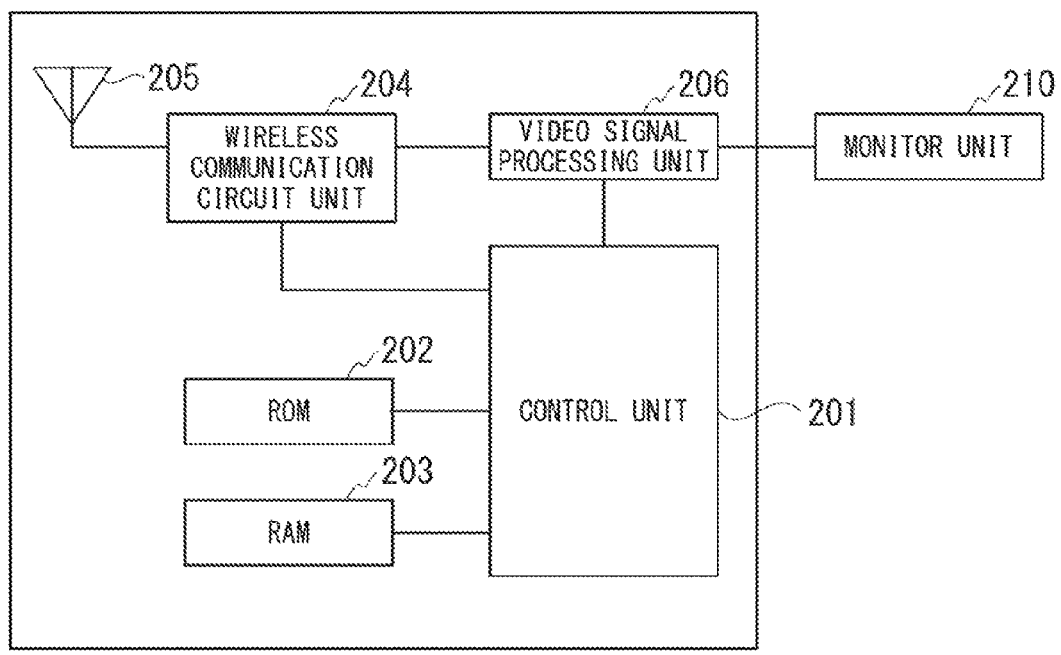
FIG. 2 is a block diagram illustrating the constitution of a video receiving terminal in accordance with the first preferred embodiment of the present invention.

FIG. 2 illustrates the electrical constitution of a video receiving terminal 200 having a video receiving/display function among wireless terminals in accordance with the first preferred embodiment. The video receiving terminal 200 includes a control unit 201 (a recognition unit, a communication control unit), a ROM 202, a RAM 203, a wireless communication circuit unit 204 (a communication unit), an antenna 205, a video signal processing unit 206, and a monitor unit 210, which are connected to one another as illustrated in FIG. 2. The elements other than the monitor unit 210 are arranged in the same housing.

The control unit 201 operates according to a program stored in the ROM 202, and controls an operation sequence of the video receiving terminal 200. The ROM 202 is a nonvolatile memory such as a Flash ROM, and stores various types of setting information including program data for controlling the video receiving terminal 200 and a communication setting parameter.

The RAM 203 is used as a work area that is used for an operation and the like of the control unit 201, and an area for temporarily storing various types of settings and the like. The wireless communication circuit unit 204 includes a high frequency circuit section necessary for wireless communication, an encoding/decoding circuit section, a buffer memory and the like, and is connected to the antenna 205. In the first preferred embodiment, as a wireless communication scheme, a predetermined wireless scheme such as IEEE 802.11 is used.

The video signal processing unit 206 expands compressed video data received in the wireless communication circuit unit 204, converts the expanded video data into a video signal such as HDMI or NTSC, and then outputs the video signal to the monitor unit 210. The monitor unit 210 includes a liquid crystal display device and a control circuit thereof, and operates as a display means that displays a video based on video data from the video transmitting terminal 100 and broadcasts a wireless connection state.

Figure 3:
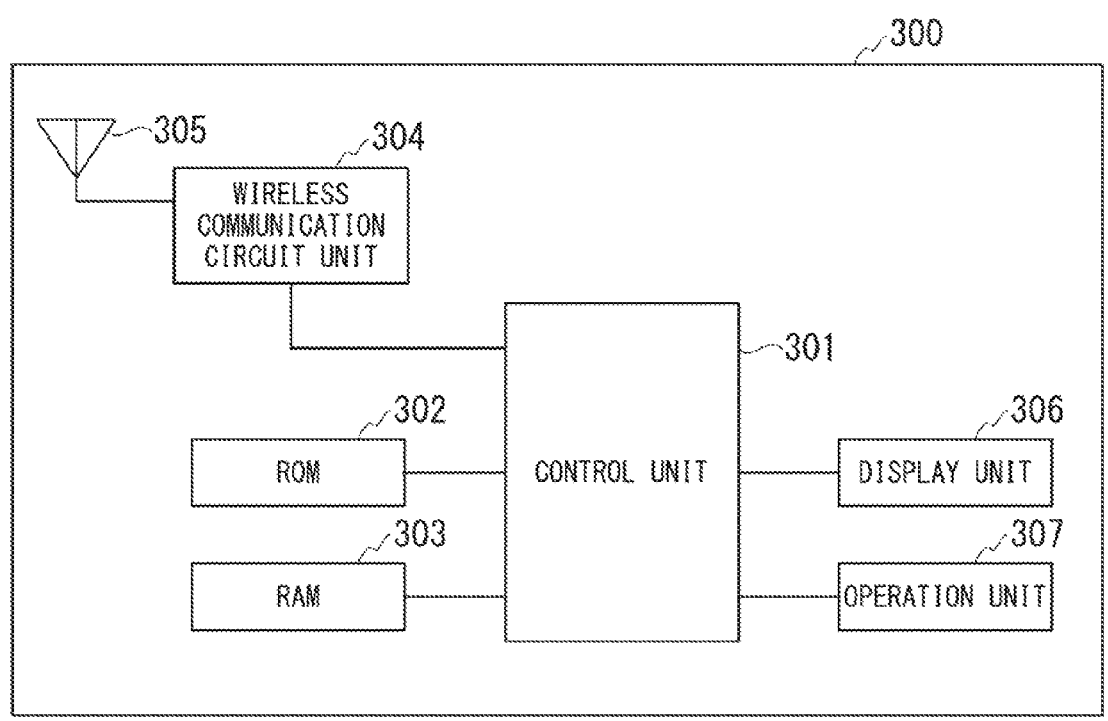
FIG. 3 is a block diagram illustrating the constitution of a control terminal in accordance with the first preferred embodiment of the present invention.

FIG. 3 illustrates the electrical constitution of a control terminal 300 having a wireless connection control function among wireless terminals in accordance with the first preferred embodiment. The control terminal 300 includes a control unit 301 (a communication control unit), a ROM 302, a RAM 303, a wireless communication circuit unit 304 (a communication unit), an antenna 305, a display unit 306, and an operation unit 307, which are connected to one another as illustrated in FIG. 3.

The control unit 301 operates according to a program stored in the ROM 302, and controls an operation sequence of the control terminal 300. The ROM 302 is a nonvolatile memory such as a Flash ROM, and stores various types of setting information including program data for controlling the control terminal 300 and a communication setting parameter.

The RAM 303 is used as a work area that is used for an operation and the like of the control unit 301, and an area for temporarily storing various types of settings and the like. The wireless communication circuit unit 304 includes a high frequency circuit section necessary for wireless communication, an encoding/decoding circuit section, a buffer memory and the like, and is connected to the antenna 305. In the first preferred embodiment, as a wireless communication scheme, a predetermined wireless scheme such as IEEE 802.11 is used.

The display unit 306 includes a liquid crystal panel and a control circuit thereof, and displays various operation screens such as menu screens. The operation unit 307 is an operation unit, such as a touch panel or a button, which is provided on the display unit 306 and allows a user to perform operation input, and notifies the control unit 301 of instruction content based on an operation of a user.

In the first preferred embodiment, attributes are set in each of the video transmitting terminal 100, the video receiving terminal 200, and the control terminal 300 according to functions of the wireless terminal. A video transmission attribute (Source) for sequentially transmitting a video in a wireless manner is set in the video transmitting terminal 100. A video reception attribute (Sink) for sequentially receiving a video in a wireless manner from the video transmitting terminal 100 and displaying the video is set in the video receiving terminal 200. An instruction attribute (Control) for instructing the video transmitting terminal 100 and the video receiving terminal 200 to transmit a video is set in the control terminal 300. As the attributes other than the instruction attribute, opposite attributes are defined. That is, the video reception attribute is defined as an opposite attribute of the video transmission attribute, and the video transmission attribute is defined as an opposite attribute of the video reception attribute. Information on each attribute is stored in the ROM 102, the ROM 202, and the ROM 302, and is read from the RAM 102, the RAM 202, and the RAM 302 and appropriately referred to at the time of operation of each terminal.

Next, an operation of the video transmitting terminal 100 will be described. In the first preferred embodiment, each of the video transmitting terminal 100 and the video receiving terminal 200 searches for connectable wireless terminals, and transmits information (a connection destination list which will be described later) on the connectable wireless terminals to the control terminal 300. The control terminal 300 selects the video transmitting terminal 100 and the video receiving terminal 200 from the wireless terminals indicated by the received information according to an instruction of a user, and instructs one (a connection destination setting terminal which will be described later) of the selected video transmitting terminal 100 and video receiving terminal 200 to establish a wireless connection. The wireless terminal having received the wireless connection instruction performs a process of establishing a wireless connection with a wireless terminal (a connection destination terminal which will be described later) indicated by the wireless connection instruction.

Figure 4:
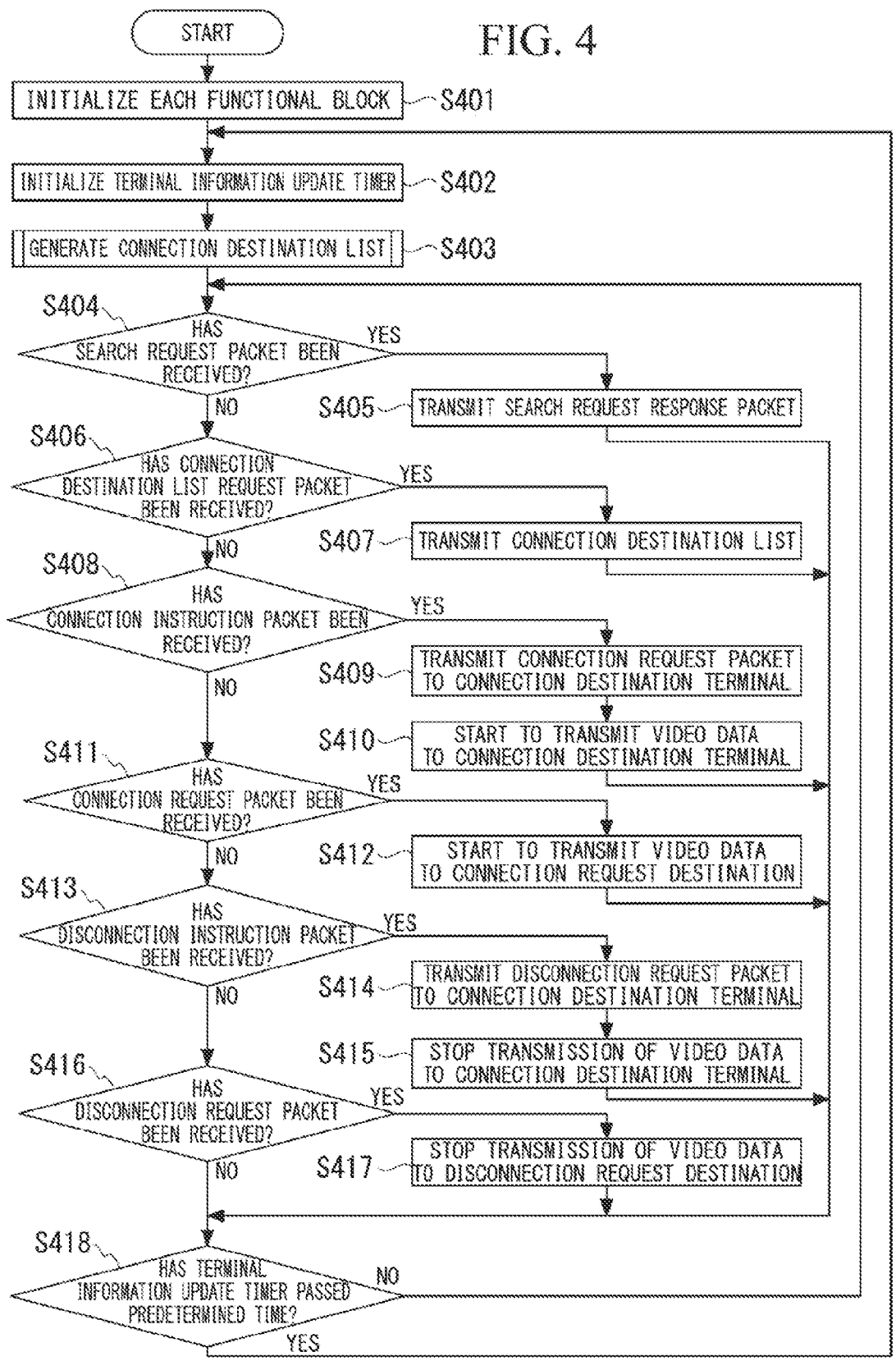
FIG. 4 is a flowchart illustrating an operation procedure of a video transmitting terminal in accordance with the first preferred embodiment of the present invention.

FIG. 4 illustrates the operation of the video transmitting terminal 100. When the video transmitting terminal 100 is powered on, the control unit 101 initializes each functional block of the video transmitting terminal 100 (step S401) and initializes a terminal information update timer (step S402). The terminal information update timer is a timer that counts a time for periodically performing a process of acquiring information on a wirelessly connectable wireless terminal.

Figure 5:
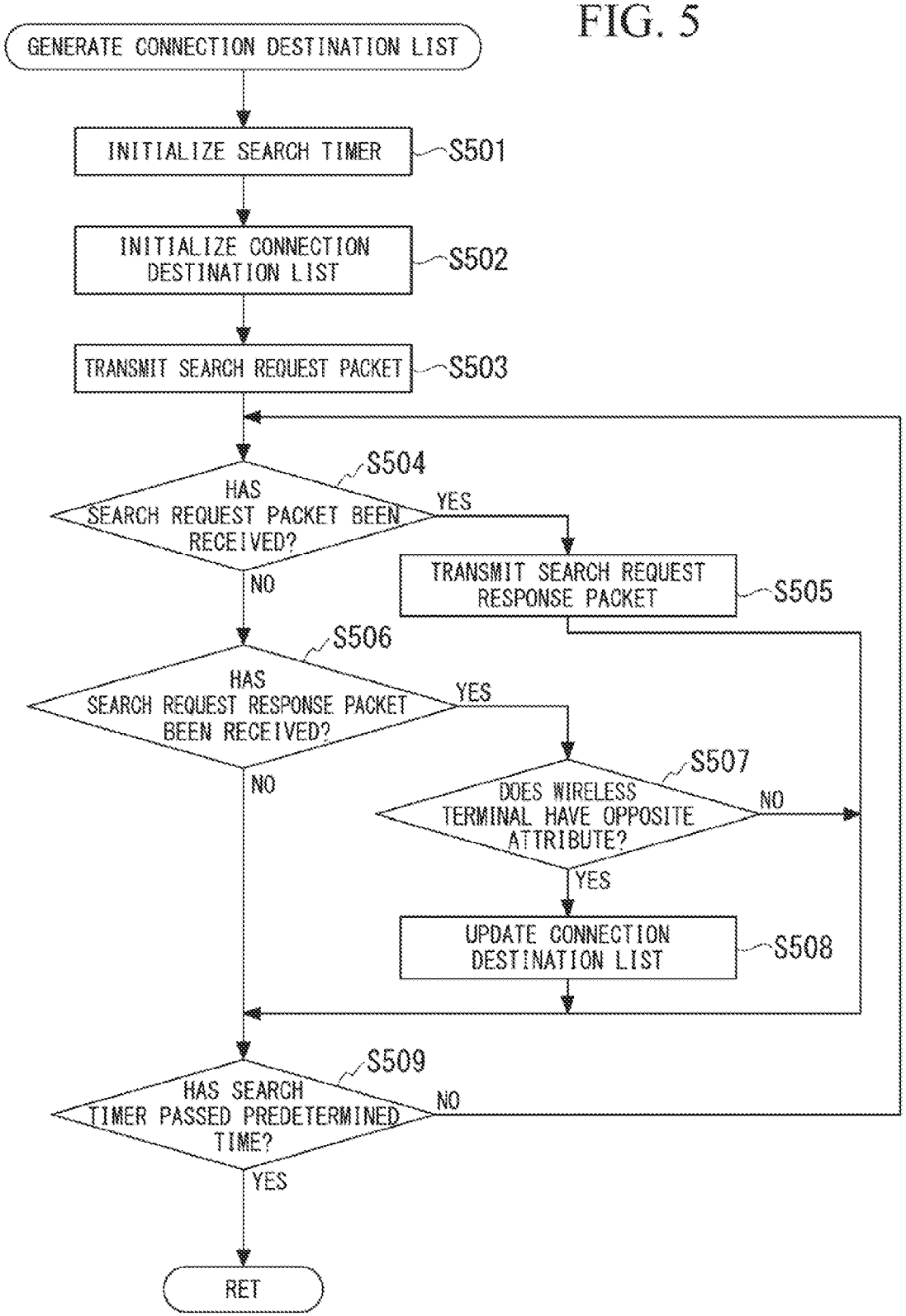
FIG. 5 is a flowchart illustrating an operation procedure of a video transmitting terminal in accordance with the first preferred embodiment of the present invention.

Next, a connection destination list is generated (step S403). The connection destination list in the video transmitting terminal 100 is a list of the video receiving terminals 200 that are candidates for a connection destination of the video transmitting terminal 100, and lists the video receiving terminals 200 to which the video transmitting terminal 100 is wirelessly connectable. FIG. 5 illustrates the operation of the video transmitting terminal 100 when the connection destination list is generated.

The control unit 101 initializes a search timer (step S501) and initializes the connection destination list stored in the RAM 103 (step S502). The search timer is a timer that counts a time for searching for a wirelessly connectable wireless terminal. Next, as will be described below, the wirelessly connectable wireless terminal is searched for and information on a discovered wireless terminal is written in the connection destination list.

In the search for the wirelessly connectable wireless terminal, a search request packet including information indicating the request of wireless terminal information is transmitted, and a search request response packet for the search request packet is received for a predetermined period. To this end, the control unit 101 controls the wireless communication circuit unit 104 to transmit a search request packet in a broadcast manner (step S503).

After the search request packet is transmitted, the control unit 101 determines whether a search request packet has been received from another wireless terminal (step S504). When the search request packet has been received, the control unit 101 transmits a search request response packet to a transmission source of the search request packet through the wireless communication circuit unit 104 (step S505). The search request response packet of the first preferred embodiment includes information on a MAC address, a terminal name, an attribute, a terminal state and the like of a transmission source of the search request response packet. Subsequently, the procedure proceeds to step S509. When the search request packet has not been received, the control unit 101 determines whether a search request response packet has been received from another wireless terminal (step S506). When the search request response packet has not been received, the procedure proceeds to step S509.

When the search request response packet has been received, the control unit 101 determines whether the wireless terminal of the transmission source of the search request response packet is a wireless terminal having an attribute (a video reception attribute) opposite to its own attribute (a video transmission attribute), based on attribute information included in the search request response packet (step S507). When the wireless terminal of the transmission source of the search request response packet is not the wireless terminal having the opposite attribute, the procedure proceeds to step S509. Furthermore, when the wireless terminal of the transmission source of the search request response packet is the wireless terminal having the opposite attribute, the control unit 101 registers the information included in the search request response packet in the connection destination list and updates the connection destination list (step S508). In this way, information on the video receiving terminal 200, to which the video transmitting terminal 100 is connectable (which is recognizable by the video transmitting terminal 100), is registered in the connection destination list. Subsequently, the procedure proceeds to step S509.

FIG. 6 illustrates an example of the content of the connection destination list. As illustrated in FIG. 6, the connection destination list includes a MAC address, a terminal name, an attribute, and a state. Since the information on the video receiving terminal 200 which has an attribute opposite to that of the video transmitting terminal 100 has been registered in the connection destination list, the attribute is Sink (a video reception attribute). This is one of a non-connected state and a connected state.

When the procedure proceeds to step S509, the control unit 101 determines whether a counted time counted by the search timer has passed a predetermined time (step S509). When the counted time has not passed the predetermined time, the procedure returns to step S504. Furthermore, when the counted time has passed the predetermined time, the generation of the connection destination list ends.

After the generation of the connection destination list ends, the control unit 101 determines whether a search request packet has been received from another wireless terminal (step S404). When the search request packet has been received, the control unit 101 transmits a search request response packet to a transmission source of the search request packet through the wireless communication circuit unit 104 (step S405). Subsequently, the procedure proceeds to step S418.

When the search request packet has not been received, the control unit 101 determines whether a connection destination list request packet has been received from another wireless terminal (step S406). The connection destination list request packet is a packet that is transmitted from the control terminal 300 and is a packet including information indicating that the connection destination list is requested to be transmitted to the control terminal 300. When the connection destination list request packet has been received, the control unit 101 reads the connection destination list from the RAM 103, and transmits the connection destination list to the transmission source of the connection destination list request packet through the wireless communication circuit unit 104 (step S407). In this way, the control terminal 300 receives the information on the video receiving terminal 200 to which the video transmitting terminal 100 is connectable from the video transmitting terminal 100. Subsequently, the procedure proceeds to step S418.

When the connection destination list request packet has not been received, the control unit 101 determines whether a connection instruction packet has been received from another wireless terminal (step S408). The connection instruction packet is a packet that is transmitted from the control terminal 300 and includes information on a MAC address of a wireless terminal (hereinafter referred to as a connection destination terminal) of a connection destination (a video transmission destination or a video transmission source), and a MAC address, an attribute and the like of the transmission destination of the connection instruction packet, together with information that instructs a connection to a wireless terminal and video transmission.

When the connection instruction packet has been received, the control unit 101 transmits a connection request packet to the connection destination terminal indicated by the connection instruction packet through the wireless communication circuit unit 104 (step S409), wherein the connection request packet includes information indicating that a wireless connection is requested. Then, the control unit 101 performs setting for transmitting video data to the connection destination terminal with respect to the wireless communication circuit unit 104 and allows the wireless communication circuit unit 104 to start the transmission of the video data to the connection destination terminal (step S410). After step S410, the wireless communication circuit unit 104 transmits the video data to the connection destination terminal. Subsequently, the procedure proceeds to step S418.

When the connection instruction packet has not been received, the control unit 101 determines whether a connection request packet has been received from another wireless terminal (step S411). The connection request packet received in the video transmitting terminal 100 is a packet that is transmitted from the video receiving terminal 200, and is a packet including information indicating that a wireless connection is requested. A transmission source of the connection request packet is a connection destination setting terminal. When the connection request packet has been received, the control unit 101 performs setting for transmitting video data to a wireless terminal of the transmission source of the connection request packet with respect to the wireless communication circuit unit 104 and allows the wireless communication circuit unit 104 to start the transmission of the video data to the connection destination terminal (step S412). After step S412, the wireless communication circuit unit 104 transmits the video data to the connection destination terminal. Subsequently, the procedure proceeds to step S418.

When the connection request packet has not been received, the control unit 101 determines whether a disconnection instruction packet has been received from another wireless terminal (step S413). The disconnection instruction packet is a packet that is transmitted from the control terminal 300 and includes information on a MAC address of a connection destination terminal, a wireless connection of which is to be disconnected, and a MAC address, an attribute and the like of the transmission destination of the disconnection instruction packet, together with information that instructs the disconnection of the wireless connection.

When the disconnection instruction packet has been received, the control unit 101 transmits a disconnection request packet to the connection destination terminal indicated by the disconnection instruction packet through the wireless communication circuit unit 104 (step S414), wherein the disconnection request packet includes information indicating that the disconnection of a wireless connection is requested. Then, the control unit 101 performs setting for stopping the transmission of video data to the connection destination terminal with respect to the wireless communication circuit unit 104 and allows the wireless communication circuit unit 104 to stop the transmission of the video data (step S415). Subsequently, the procedure proceeds to step S418.

When the disconnection instruction packet has not been received, the control unit 101 determines whether a disconnection request packet has been received from another wireless terminal (step S416). The disconnection request packet received in the video transmitting terminal 100 is a packet that is transmitted from the video receiving terminal 200, and is a packet including information indicating that the disconnection of a wireless connection is requested. When the disconnection request packet has been received, the control unit 101 performs setting for stopping the transmission of video data to a transmission source of the disconnection request with respect to the wireless communication circuit unit 104 and allows the wireless communication circuit unit 104 to stop the transmission of the video data (step S417). Subsequently, the procedure proceeds to step S418.

When the procedure proceeds to step S418, the control unit 101 determines whether a counted time counted by the terminal information update timer has passed a predetermined time (step S418). When the counted time has not passed the predetermined time, the procedure returns to step S404. Furthermore, when the counted time has passed the predetermined time, the procedure returns to step S402. In this way, the connection destination list is updated again in step S403. In the aforementioned operation, since the connection destination list is updated at an interval of the predetermined time having been set in the terminal information update timer, the video transmitting terminal 100 holds the latest connection destination list in a state in which the latest connection destination list can be transmitted to the control terminal 300.

Figure 7:
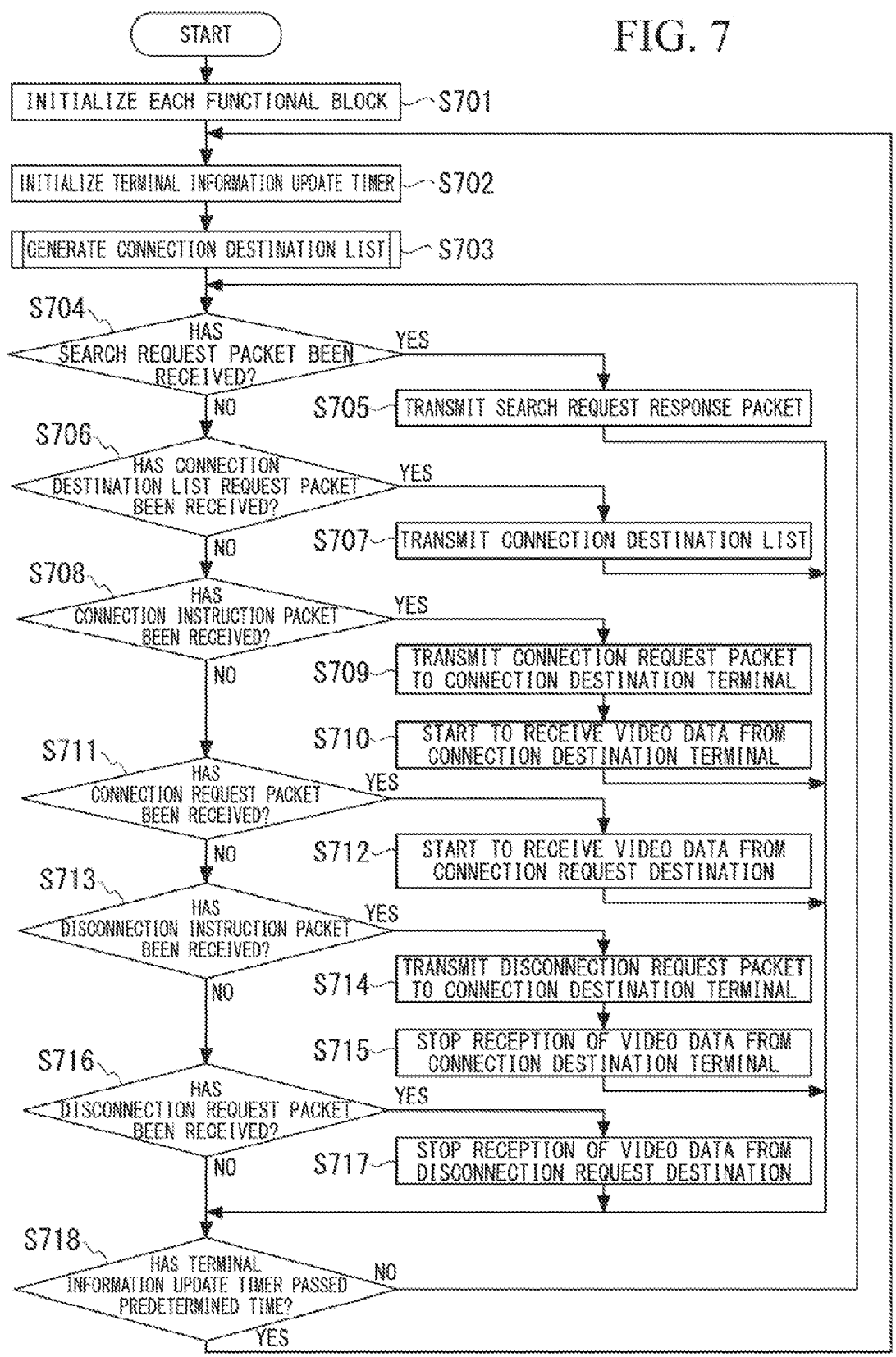
FIG. 7 is a flowchart illustrating an operation procedure of a video receiving terminal in accordance with the first preferred embodiment of the present invention.

Next, an operation of the video receiving terminal 200 will be described. FIG. 7 illustrates the operation of the video receiving terminal 200. When the video receiving terminal 200 is powered on, the control unit 201 initializes each functional block of the video receiving terminal 200 (step S701) and initializes a terminal information update timer (step S702). Next, a connection destination list is generated (step S703). The connection destination list in the video receiving terminal 200 is a list of the video transmitting terminals 100 that are candidates for a connection destination of the video receiving terminal 200, and lists the video transmitting terminals 100 to which the video receiving terminal 200 is wirelessly connectable. Since a generation procedure of the connection destination list is the same as the procedure illustrated in FIG. 5 except that the information on the video transmitting terminal 100 is registered in the connection destination list when a search request response packet has been received from the video transmitting terminal 100 that is a wireless terminal having a video transmission attribute, a description thereof will be omitted.

After the generation of the connection destination list ends, the control unit 201 determines whether a search request packet has been received from another wireless terminal (step S704). When the search request packet has been received, the control unit 201 transmits a search request response packet to a transmission source of the search request packet through the wireless communication circuit unit 204 (step S705). Subsequently, the procedure proceeds to step S718.

When the search request response packet has not been received, the control unit 201 determines whether a connection destination list request packet has been received from another wireless terminal (step S706). When the connection destination list request packet has been received, the control unit 201 reads the connection destination list from the RAM 203, and transmits the connection destination list to the transmission source of the connection destination list request packet through the wireless communication circuit unit 204 (step S707). In this way, the control terminal 300 receives the information on the video transmitting terminal 100 to which the video receiving terminal 200 is connectable from the video receiving terminal 200. Subsequently, the procedure proceeds to step S718.

When the connection destination list request packet has not been received, the control unit 201 determines whether a connection instruction packet has been received from another wireless terminal (step S708). When the connection instruction packet has been received, the control unit 201 transmits a connection request packet to the connection destination terminal indicated by the connection instruction packet through the wireless communication circuit unit 104 (step S709), wherein the connection request packet includes information indicating that a wireless connection is requested. Then, the control unit 201 performs setting for receiving video data from the connection destination terminal with respect to the wireless communication circuit unit 204 and allows the wireless communication circuit unit 204 to start the reception of the video data from the connection destination terminal (step S710). After step S710, the wireless communication circuit unit 104 receives the video data from the connection destination terminal. Subsequently, the procedure proceeds to step S718.

When the connection instruction packet has not been received, the control unit 201 determines whether a connection request packet has been received from another wireless terminal (step S711). The connection request packet received in the video receiving terminal 200 is a packet that is transmitted from the video transmitting terminal 100, and is a packet including information indicating that a wireless connection is requested. A transmission source of the connection request packet is a connection destination setting terminal. When the connection request packet has been received, the control unit 201 performs setting for receiving video data from a wireless terminal of the transmission source of the connection request packet with respect to the wireless communication circuit unit 204 and allows the wireless communication circuit unit 204 to start the reception of the video data from the connection destination terminal (step S712). After step S712, the wireless communication circuit unit 204 receives the video data from the connection destination terminal. Subsequently, the procedure proceeds to step S718.

When the connection request packet has not been received, the control unit 201 determines whether a disconnection instruction packet has been received from another wireless terminal (step S713). When the disconnection instruction packet has been received, the control unit 201 transmits a disconnection request packet to the connection destination terminal indicated by the disconnection instruction packet through the wireless communication circuit unit 204 (step S714), wherein the disconnection request packet includes information indicating that the disconnection of a wireless connection is requested. Then, the control unit 201 performs setting for stopping the reception of video data from the connection destination terminal with respect to the wireless communication circuit unit 204 and allows the wireless communication circuit unit 204 to stop the reception of the video data (step S715). Subsequently, the procedure proceeds to step S718.

When the disconnection instruction packet has not been received, the control unit 201 determines whether a disconnection request packet has been received from another wireless terminal (step S716). The disconnection request packet received in the video receiving terminal 200 is a packet that is transmitted from the video transmitting terminal 100, and is a packet including information indicating that the disconnection of a wireless connection is requested. When the disconnection request packet has been received, the control unit 201 performs setting for stopping the reception of video data from the transmission source of the disconnection request with respect to the wireless communication circuit unit 204 and allows the wireless communication circuit unit 204 to stop the reception of the video data (step S717). Subsequently, the procedure proceeds to step S718.

When the procedure proceeds to step S718, the control unit 201 determines whether a counted time counted by the terminal information update timer has passed a predetermined time (step S718). When the counted time has not passed the predetermined time, the procedure returns to step S704. Furthermore, when the counted time has passed the predetermined time, the procedure returns to step S702. In this way, the connection destination list is updated again in step S703. Since the connection destination list is updated at an interval of the predetermined time having been set in the terminal information update timer, the video receiving terminal 200 holds the latest connection destination list in a state in which the latest connection destination list can be transmitted to the control terminal 300.

Figure 8:
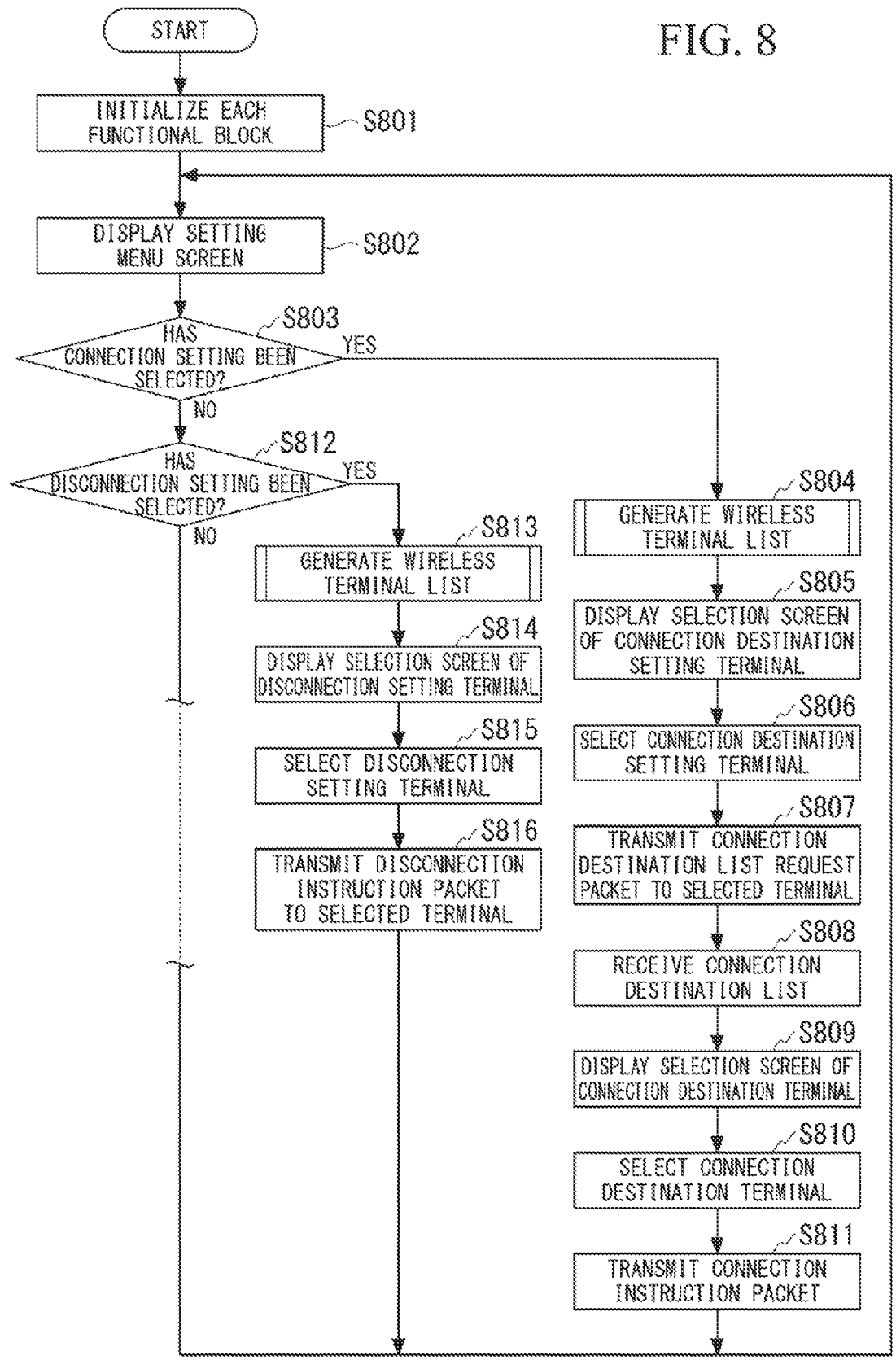
FIG. 8 is a flowchart illustrating an operation procedure of a control terminal in accordance with the first preferred embodiment of the present invention.

Next, an operation of the control terminal 300 will be described. FIG. 8 illustrates the operation of the control terminal 300. When the control terminal 300 is powered on, the control unit 301 initializes each functional block of the control terminal 300 (step S801). Next, the control unit 301 displays a setting menu screen on the display unit 306 (step S802).

Figure 10A:
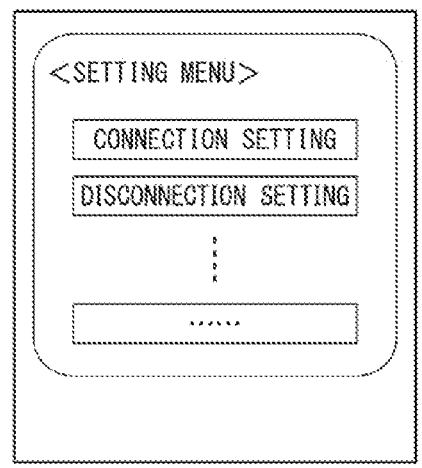
FIG. 10A is a reference diagram illustrating a display screen of a control terminal in accordance with the first preferred embodiment of the present invention.

FIG. 10A illustrates an example of the setting menu screen that is displayed on the display unit 306. As illustrated in FIG. 10A, on the setting menu screen, items such as connection setting or disconnection setting are displayed. Since a user is able to select each item, when the user operates the operation unit 307 to select an item, the operation unit 307 notifies the control unit 301 of information on the selected item.

Next, based on the information on the item, which has been notified of by the operation unit 307, the control unit 301 selects whether the connection setting has been selected (step S803). When the connection setting has been selected, a wireless terminal list is generated (step S804). The wireless terminal list is a list of the video transmitting terminals 100 and the video receiving terminals 200 to which the control terminal 300 is connectable. FIG. 9 illustrates the operation of the control terminal 300 when the wireless terminal list is generated.

The control unit 301 initializes a search timer (step S901) and initializes the wireless terminal list stored in the RAM 303 (step S902). Then, as described below, a wirelessly connectable wireless terminal is searched for and information on a discovered wireless terminal is written in the wireless terminal list.

The control unit 301 controls the wireless communication circuit unit 304 to transmit a search request packet in a broadcast manner (step S903). After the search request packet is transmitted, the control unit 301 determines whether a search request packet has been received from another wireless terminal (step S904). When the search request packet has been received, the control unit 301 transmits a search request response packet to a transmission source of the search request packet through the wireless communication circuit unit 304 (step S905). Subsequently, the procedure proceeds to step S908.

When the search request packet has not been received, the control unit 301 determines whether a search request response packet has been received from another wireless terminal (step S906). When the search request response packet has not been received, the procedure proceeds to step S908.

When the search request response packet has been received, the control unit 301 registers information (information on a transmission source of the search request response packet) included in the search request response packet in the wireless terminal list, and updates the wireless terminal list (step S907). Subsequently, the procedure proceeds to step S908.

FIG. 11A and FIG. 11B illustrate an example of the content of the wireless terminal list. As illustrated in FIG. 11A and FIG. 11B, the wireless terminal list includes a MAC address, a terminal name, an attribute, and a state. In the first preferred embodiment, regardless of the attributes of wireless terminals, information on all wireless terminals within the coverage of the control terminal 300 is collected and registered in the wireless terminal list.

When the procedure proceeds to step S908, the control unit 301 determines whether a counted time counted by the search timer has passed a predetermined time (step S908). When the counted time has not passed the predetermined time, the procedure returns to step S904. Furthermore, when the counted time has passed the predetermined time, the generation of the wireless terminal list ends.

After the generation of the wireless terminal list ends, the control unit 301 reads the wireless terminal list from the RAM 303, and displays a selection screen of the connection destination setting terminal on the display unit 306 based on information on a wireless terminal in a "non-connected" state among the wireless terminals registered in the wireless terminal list (step S805). The connection destination setting terminal of the first preferred embodiment is a wireless terminal that performs a process of receiving the connection instruction packet from the control terminal 300 and establishing a wireless connection with a connection destination terminal indicated by the connection instruction packet. Furthermore, the connection destination terminal is a wireless terminal that performs video transmission or reception with respect to the connection destination setting terminal, and has an attribute opposite to that of the connection destination setting terminal.

Figure 10B:
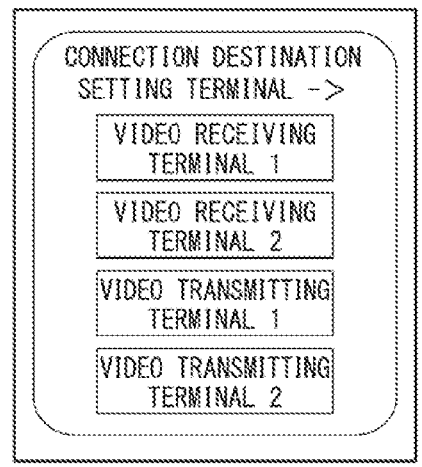
FIG. 10B is a reference diagram illustrating a display screen of a control terminal in accordance with the first preferred embodiment of the present invention.

FIG. 10B illustrates an example of the selection screen of the connection destination setting terminal, which is displayed on the display unit 306. On the selection screen of the connection destination setting terminal, a terminal name of the video transmitting terminal 100 or the video receiving terminal 200 registered in the wireless terminal list is displayed in the form of a button. A user is able to press the displayed button to select a wireless terminal to be set as the connection destination setting terminal. When the user operates the operation unit 307 to select the connection destination setting terminal, the operation unit 307 notifies the control unit 301 of information on the selected connection destination setting terminal.

Next, based on the information on the connection destination setting terminal, which has been notified of by the operation unit 307, the control unit 301 selects the connection destination setting terminal from the wireless terminals registered in the wireless terminal list (step S806). At this time, the control unit 301 changes the state of the selected connection destination setting terminal to "connected" in the wireless terminal list. Next, the control unit 301 transmits a connection destination list request packet to the connection destination setting terminal selected in step S806 through the wireless communication circuit unit 304 (step S807).

As described above, the video transmitting terminal 100 or the video receiving terminal 200 having received the connection destination list request packet transmits the connection destination list to the control terminal 300. The control unit 301 receives the connection destination list through the wireless communication circuit unit 304 and stores the connection destination list in the RAM 303 (step S808). Next, the control unit 301 reads the connection destination list from the RAM 303, and displays the selection screen of the connection destination terminal on the display unit 306 (step S809).

Figure 10C:
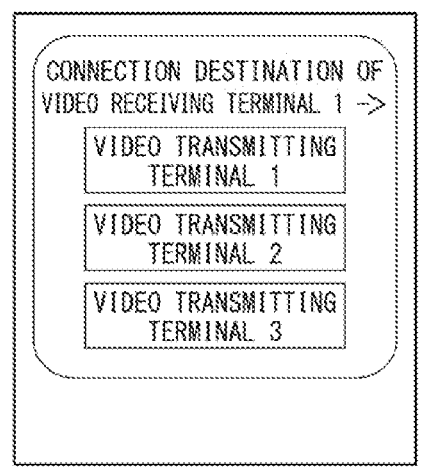
FIG. 10C is a reference diagram illustrating a display screen of a control terminal in accordance with the first preferred embodiment of the present invention.

FIG. 10C illustrates an example of the selection screen of the connection destination terminal, which is displayed on the display unit 306. On the selection screen of the connection destination terminal, the terminal name of the video transmitting terminal 100 or the video receiving terminal 200 registered in the connection destination list is displayed in the form of a button. FIG. 10C is an example when the video receiving terminal 200 has been selected as the connection destination setting terminal, and the terminal name of the video transmitting terminal 100, which transmits a video to the video receiving terminal 200 serving as the connection destination setting terminal, is displayed. A user is able to press the displayed button to select a wireless terminal to be set as the connection destination terminal. When the user operates the operation unit 307 to select the connection destination terminal, the operation unit 307 notifies the control unit 301 of information on the selected connection destination terminal. When the connection destination terminal is selected, the video transmitting terminal 100 and the video receiving terminal 200, which perform video transmission/reception with respect to each other, are fixed.

Next, based on the information on the connection destination terminal, which has been notified of by the operation unit 307, the control unit 301 selects the connection destination terminal from the wireless terminals registered in the connection destination list (step S810). The control unit 301 transmits a connection instruction packet to the connection destination setting terminal selected in step S806 through the wireless communication circuit unit 304 (step S811). Subsequently, the procedure returns to step S802.

The connection destination setting terminal having received the connection instruction packet transmits a connection request packet to a connection destination terminal indicated by the connection instruction packet, and then performs an establishment process of a wireless connection. Meanwhile, the connection destination terminal receives the connection request packet transmitted from the connection destination setting terminal, and then performs an establishment process of a wireless connection. Through this operation, a wireless connection is made between the connection destination setting terminal and the connection destination terminal, so that the transmission of video data is started.

When the connection setting has not been selected in step S803, the control unit 301 selects whether disconnection setting has been selected based on information on the item notified of by the operation unit 307 (step S812). When the disconnection setting has been selected, the wireless terminal list is generated (step S813). The generation procedure of the wireless terminal list in step S813 is the same as the procedure illustrated in FIG. 9.

After the generation of the wireless terminal list ends, the control unit 301 reads the wireless terminal list from the RAM 303, and displays a selection screen of a disconnection setting terminal on the display unit 306 based on information on a wireless terminal in a "connected" state among the wireless terminals registered in the wireless terminal list (step S805). The disconnection setting terminal of the first preferred embodiment is a wireless terminal that receives an instruction for disconnecting a wireless connection from the control terminal 300.

Figure 12:
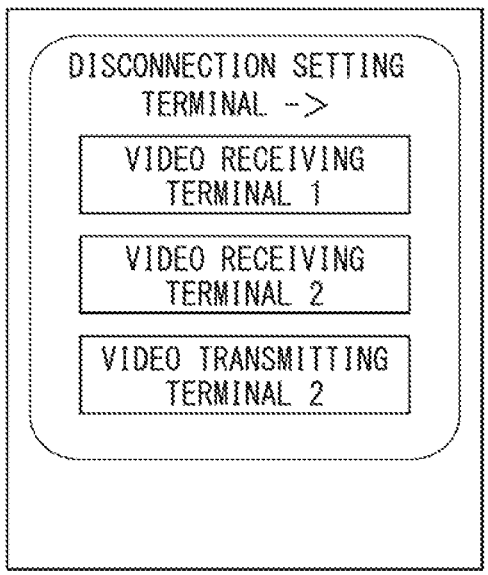
FIG. 12 is a reference diagram illustrating a display screen of a control terminal in accordance with the first preferred embodiment of the present invention.
Figure 13:
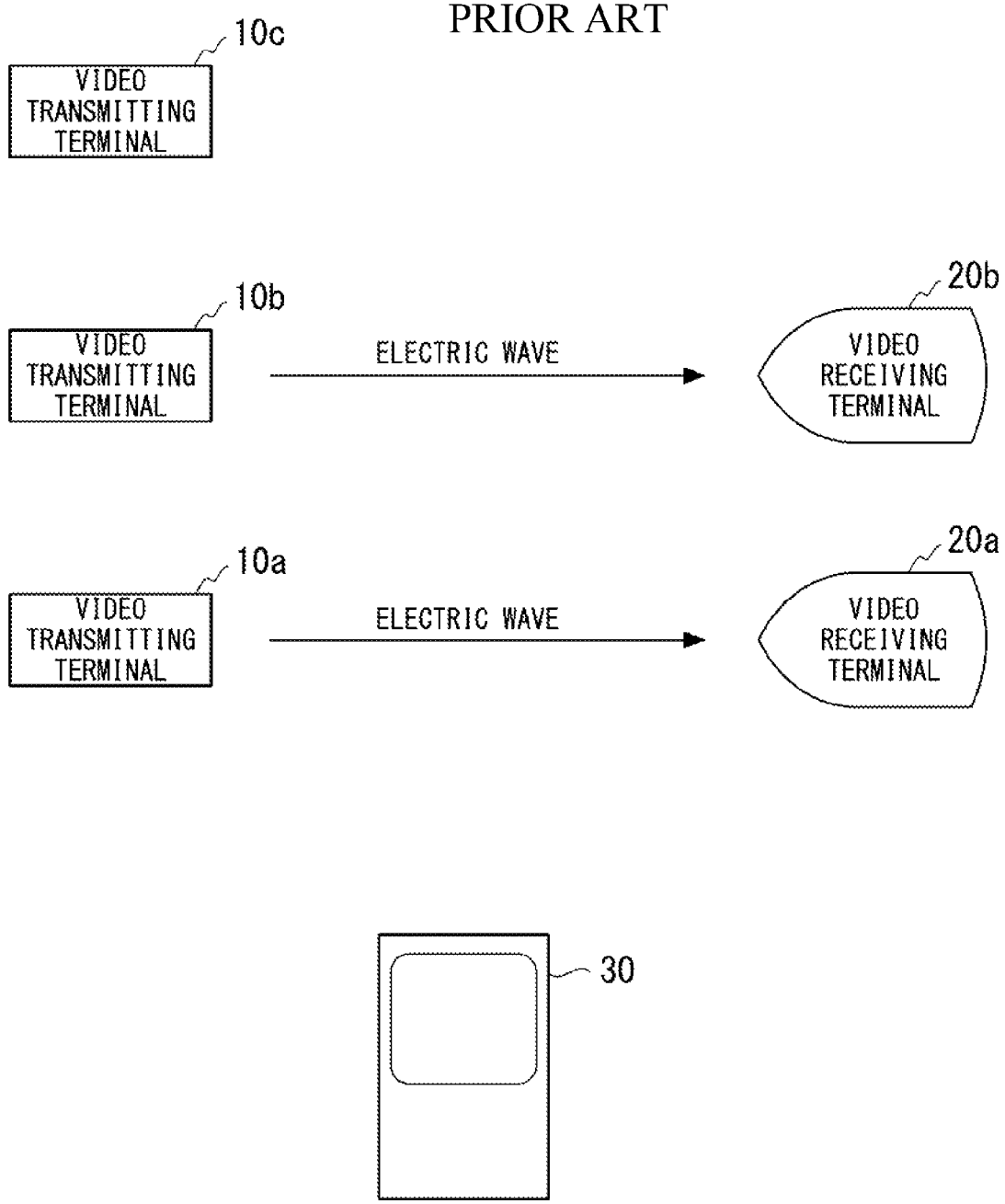
FIG. 13 is an explanation diagram for explaining a wireless connection switching method in a conventional wireless system.
Figure 14:
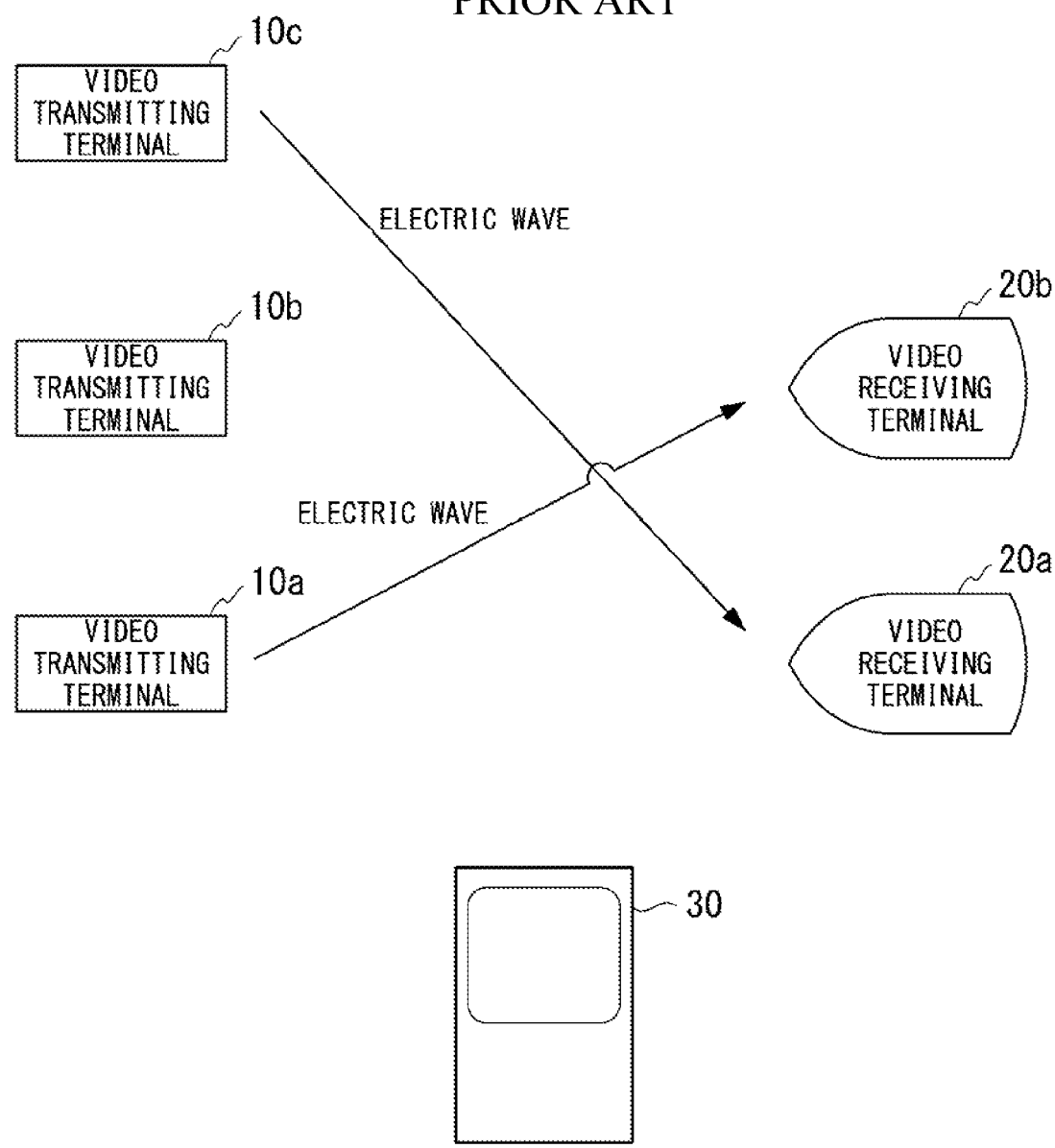
FIG. 14 is an explanation diagram for explaining a wireless connection switching method in a conventional wireless system.
Figure 15:
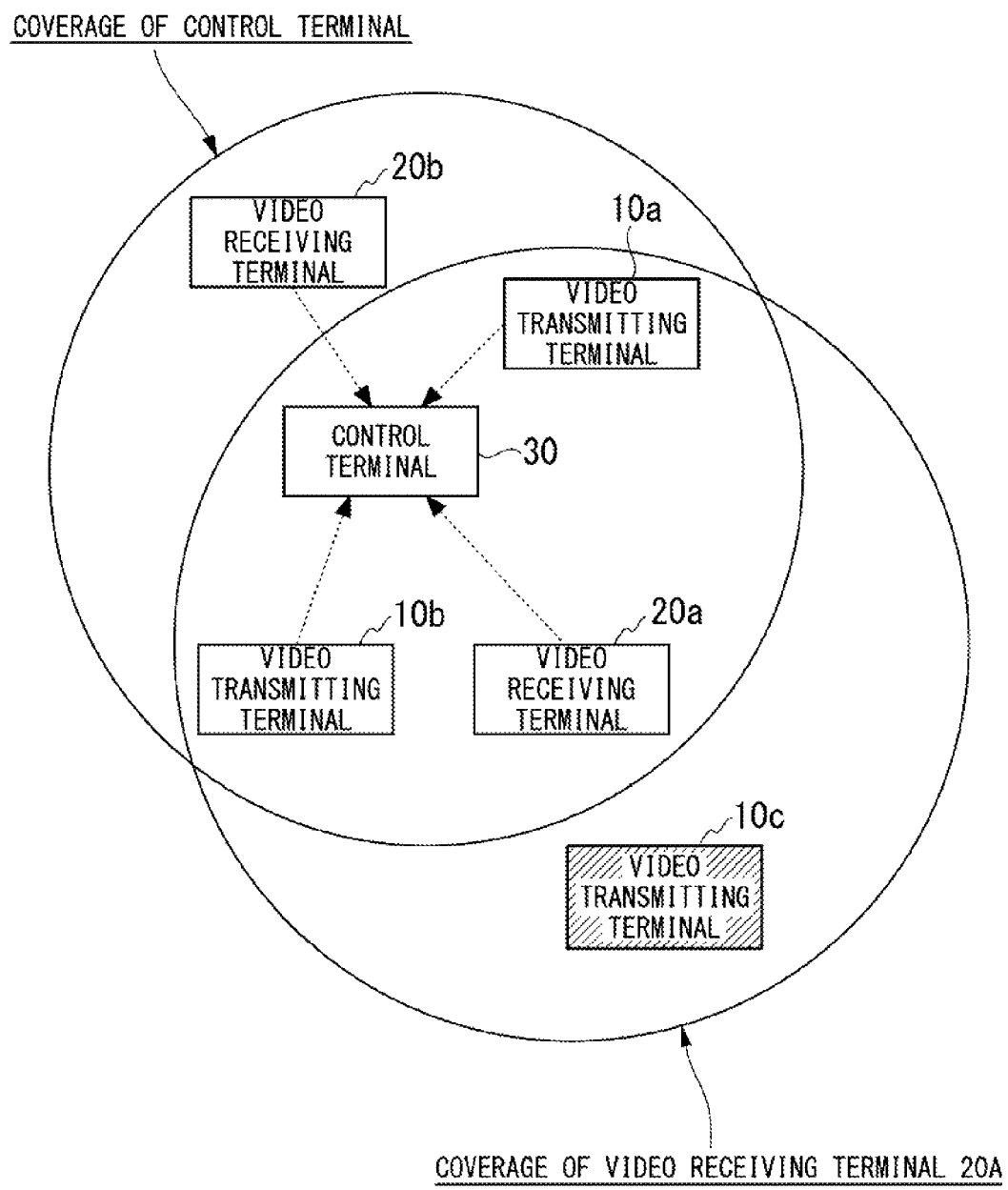
FIG. 15 is an explanation diagram for explaining a problem of a conventional wireless system.

In the example of the wireless terminal list illustrated in FIG. 11B, the states of wireless terminals except for a "video transmitting terminal 1" are "connected." The wireless terminals in the "connected" state are displayed on the selection screen of the disconnection setting terminal FIG. 12 illustrates an example of the selection screen of the disconnection setting terminal, which is displayed on the display unit 306. On the selection screen of the disconnection setting terminal, the terminal name of the video transmitting terminal 100 or the video receiving terminal 200 registered in the wireless terminal list is displayed in the form of a button. A user is able to press the displayed button to select a wireless terminal to be set as the disconnection setting terminal. When the user operates the operation unit 307 to select the disconnection setting terminal, the operation unit 307 notifies the control unit 301 of information on the selected disconnection setting terminal.

Next, based on the information on the disconnection setting terminal, which has been notified of by the operation unit 307, the control unit 301 selects the disconnection setting terminal from the wireless terminals registered in the wireless terminal list (step S815). At this time, the control unit 301 changes the state of the selected disconnection setting terminal to "non-connected" in the wireless terminal list. Next, the control unit 301 transmits a disconnection instruction packet to the disconnection setting terminal selected in step S815 through the wireless communication circuit unit 304 (step S816). Subsequently, the procedure returns to step S802.

When the disconnection setting has not been selected in step S812, an operation corresponding to the item selected on the setting menu screen illustrated in FIG. 10A is performed, but a detailed description thereof will be omitted.

As described above, according to the first preferred embodiment, the connection destination list, which includes information on a wireless terminal that has an attribute opposite to that of the video transmitting terminal 100 or the video receiving terminal 200 and is recognizable by the video transmitting terminal 100 or the video receiving terminal 200, is transmitted to the control terminal 300, so that the control terminal 300 is able to recognize a wireless terminal, which is not directly recognizable by the control terminal 300, through the connection destination list. Furthermore, the video transmitting terminal 100 or the video receiving terminal 200 receives the connection instruction packet from the control terminal 300 and performs an establishment process of a wireless connection with respect to a wireless terminal having an opposite attribute designated by the connection instruction packet, so that it is possible to establish a wireless connection among wireless terminals connectable to one another. Moreover, it is possible to establish a wireless connection between a wireless terminal not directly recognizable by the control terminal 300 and a wireless terminal directly recognizable by the control terminal 300.

Furthermore, as illustrated in FIG. 4 and FIG. 7, the connection destination list is transmitted at an interval of a predetermined time during video transmission, so that the control terminal 300 is able to hold the latest information on a wireless terminal to which peripheral wireless terminals are connectable.

According to a preferred embodiment of the present invention, information on an opposite attribute wireless terminal recognizable by a wireless terminal is transmitted to an instruction attribute wireless terminal, so that the instruction attribute wireless terminal is able to recognize a wireless terminal which is not directly recognizable by the instruction attribute wireless terminal through the information from the wireless terminal. Furthermore, the wireless terminal receives information, which instructs video transmission and designates the opposite attribute wireless terminal that is a video transmission destination, from the instruction attribute wireless terminal and performs a process of establishing a wireless connection with the opposite attribute wireless terminal designated by the information, so that it is possible to establish a wireless connection among wireless terminals connectable to one another.

While preferred embodiments of the present invention have been described and illustrated above, it should be understood that these are examples of the present invention and are not to be considered as limiting. Additions, omissions, substitutions, and other modifications can be made without departing from the scope of the present invention.

The present invention can be extensively applied to a wireless system which allows wireless terminals to be connected to one another, and can establish a wireless connection among wireless terminals connectable to one another.

What is claimed is:

1. A wireless terminal, which includes only a video transmission attribute or only a video reception attribute, the video transmission attribute being defined as an attribute for wirelessly transmitting a video, the video reception attribute being defined as an attribute for wirelessly receiving and displaying the video, and an instruction attribute being defined as an attribute for instructing at least one of a plurality of wireless terminals having only the video transmission attribute or at least one of a plurality of wireless terminals having only the video reception attribute to establish transmission of the video, the wireless terminal comprising:
   a communication unit that wirelessly transmits/receives information;
   a communication control unit that controls the wireless terminal to search for a connectable wireless terminal; and
   a recognition unit that recognizes whether the connectable wireless terminal is an opposite attribute wireless terminal based on identification information wirelessly received from the connectable wireless terminal, wherein a wireless terminal having an attribute opposite to an attribute of its own terminal between the video transmission attribute and the video reception attribute is defined as the opposite attribute wireless terminal,
   wherein the communication control unit controls the communication unit to wirelessly transmit the identification information on the connectable wireless terminal recognized as the opposite attribute wireless terminal to an instruction attribute wireless terminal when the recognition unit recognizes that the connectable wireless terminal is the opposite attribute wireless terminal,
   wherein the communication control unit controls the communication unit not to wirelessly transmit the identification information on the connectable wireless terminal recognized not to be the opposite attribute wireless terminal to the instruction attribute wireless terminal when the recognition unit recognizes that the connectable wireless terminal is not the opposite attribute wireless terminal,
   wherein the communication control unit controls the communication unit to perform a process of establishing a wireless connection with the opposite attribute wireless terminal designated by wirelessly received information when the communication unit wirelessly receives, from the instruction attribute wireless terminal, the information for instructing video transmission and designating the opposite attribute wireless terminal that is a connection destination, and
   wherein the instruction attribute wireless terminal is defined as a wireless terminal that has the instruction attribute, the instruction attribute wireless terminal being different from either the own terminal or the connectable wireless terminal.

2. The wireless terminal according to claim 1, wherein, in a state in which communication with the opposite attribute wireless terminal has been established, the communication control unit further controls the communication unit to transmit the identification information on the connectable wireless terminal recognized as the opposite attribute wireless terminal to the instruction attribute wireless terminal.

3. A wireless system, which includes a plurality of wireless terminals having only a video transmission attribute and a plurality of wireless terminals having only a video reception attribute, the video transmission attribute being defined as an attribute for wirelessly transmitting a video, the video reception attribute being defined as an attribute for wirelessly receiving and displaying the video, and an instruction attribute being defined as an attribute for instructing at least one of a plurality of wireless terminals having only the video transmission attribute to establish transmission of the video, wherein a wireless terminal having only the video transmission attribute or only the video reception attribute comprises:
   a first communication unit that transmits/receives information;
   a first communication control unit that controls the wireless terminal to search for a connectable wireless terminal; and
   a recognition unit that recognizes whether the connectable wireless terminal is an opposite attribute wireless terminal based on identification information wirelessly received from the connectable wireless terminal, wherein a wireless terminal having an attribute opposite to an attribute of its own terminal between the video transmission attribute and the video reception attribute is defined as the opposite attribute wireless terminal,
   wherein the first communication control unit controls the first communication unit to wirelessly transmit the identification information on the connectable wireless terminal recognized as the opposite attribute wireless terminal to an instruction attribute wireless terminal when the recognition unit recognizes that the connectable wireless terminal is the opposite attribute wireless terminal,
   wherein the first communication control unit controls the first communication unit not to wirelessly transmit the identification information on the connectable wireless terminal recognized not to be the opposite attribute wireless terminal to the instruction attribute wireless terminal when the recognition unit recognizes that the connectable wireless terminal is not the opposite attribute wireless terminal, wherein the first communication control unit controls the first communication unit to perform a process of establishing a wireless connection with the opposite attribute wireless terminal designated by wirelessly received information when the first communication unit receives, from the instruction attribute wireless terminal, the information for instructing video transmission and designating the opposite attribute wireless terminal that is a connection destination, and wherein the instruction attribute wireless terminal is defined as a wireless terminal that has the instruction attribute, the instruction attribute wireless terminal being different from either the own terminal or the connectable wireless terminal.

4. The wireless system according to claim 3, wherein the instruction attribute wireless terminal comprises:

a second communication unit that transmits/receives information; and a second communication control unit that selects a first wireless terminal having only the video transmission attribute and a second wireless terminal having only the video reception attribute from wireless terminals indicated by the identification information on the connectable wireless terminal recognized as the opposite attribute wireless terminal received by the second communication unit, wherein the second communication control unit controls the second communication unit to wirelessly transmit information, the information instructing video transmission and designating one of the first wireless terminal and the second wireless terminal as the opposite attribute wireless terminal that is a connection destination, to a remaining one of the first wireless terminal and the second wireless terminal.

5. A wireless communication method, by using a wireless terminal that includes only a video transmission attribute or only a video reception attribute, the video transmission attribute being defined as an attribute for wirelessly transmitting a video, the video reception attribute being defined as an attribute for wirelessly receiving and displaying the video, and an instruction attribute being defined as an attribute for instructing at least one of a plurality of wireless terminals having only the video transmission attribute or at least one of a plurality of wireless terminals having only the video reception attribute to establish transmission of the video, the wireless communication method comprising:

wirelessly transmitting/receiving information by a communication unit;

controlling the wireless terminal to search for a connectable wireless terminal;

recognizing, by a recognition unit, whether the connectable wireless terminal is an opposite attribute wireless terminal based on identification information wirelessly received from the connectable wireless terminal, wherein a wireless terminal having an attribute opposite to an attribute of its own terminal between the video transmission attribute and the video reception attribute is defined as the opposite attribute wireless terminal;

controlling the communication unit to wirelessly transmit the identification information on the connectable wireless terminal recognized as the opposite attribute wireless terminal to the instruction attribute wireless terminal when the recognition unit recognizes that the connectable wireless terminal is the opposite attribute wireless terminal;

controlling the communication unit not to wirelessly transmit the identification information on the connectable wireless terminal recognized not to be the opposite attribute wireless terminal to the instruction attribute wireless terminal when the recognition unit recognizes that the connectable wireless terminal is not the opposite attribute wireless terminal; and controlling the communication unit to perform a process of establishing a wireless connection with the opposite attribute wireless terminal designated by wirelessly received information when the communication unit wirelessly receives, from the instruction attribute wireless terminal, the information for instructing video transmission and designating the opposite attribute wireless terminal that is a connection destination, wherein the instruction attribute wireless terminal is defined as a wireless terminal that has the instruction attribute, the instruction attribute wireless terminal being different from either the own terminal or the connectable wireless terminal.

6. A non-transitory readable device recording programmed instructions for a wireless terminal, which includes only a video transmission attribute or only a video reception attribute, the video transmission attribute being defined as an attribute for wirelessly transmitting a video, the video reception attribute being defined as an attribute for wirelessly receiving and displaying the video, and an instruction attribute being defined as an attribute for instructing at least one of a plurality of wireless terminals having only the video transmission attribute or at least one of a plurality of wireless terminals having only the video reception attribute to establish transmission of the video, wherein the instructions, when executed by a computer, cause the computer to perform:

wirelessly transmitting/receiving information by a communication unit;

controlling the wireless terminal to search for a connectable wireless terminal;

recognizing, by a recognition unit, whether the connectable wireless terminal is an opposite attribute wireless terminal based on identification information wirelessly received from the connectable wireless terminal, wherein a wireless terminal having an attribute opposite to an attribute of its own terminal between the video transmission attribute and the video reception attribute is defined as the opposite attribute wireless terminal;

controlling the communication unit to wirelessly transmit the identification information on the connectable wireless terminal recognized as the opposite attribute wireless terminal to the instruction attribute wireless terminal when the recognition unit recognizes that the connectable wireless terminal is the opposite attribute wireless terminal;

controlling the communication unit not to wirelessly transmit the identification information on the connectable wireless terminal recognized not to be the opposite attribute wireless terminal to the instruction attribute wireless terminal when the recognition unit recognizes that the connectable wireless terminal is not the opposite attribute wireless terminal; and controlling the communication unit to perform a process of establishing a wireless connection with the opposite attribute wireless terminal designated by wirelessly received information when the communication unit wirelessly receives, from the instruction attribute wireless terminal, the information for instructing video transmission and designating the opposite attribute wireless terminal that is a connection destination,
wherein the instruction attribute wireless terminal is defined as a wireless terminal that has the instruction attribute, the instruction attribute wireless terminal being different from either the own terminal or the connectable wireless terminal.

* * * * *